May 15, 1928.　　　　A. GALDI ET AL　　　　1,669,460
LIQUID GAUGE
Filed May 21, 1925
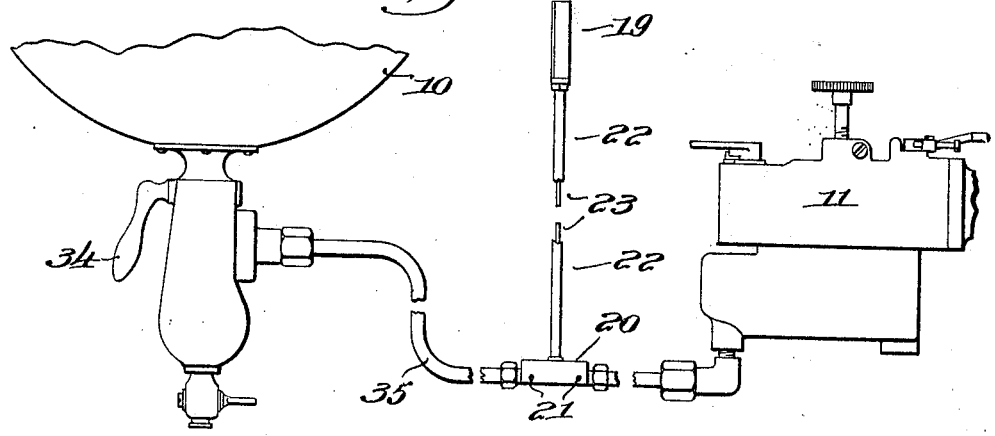
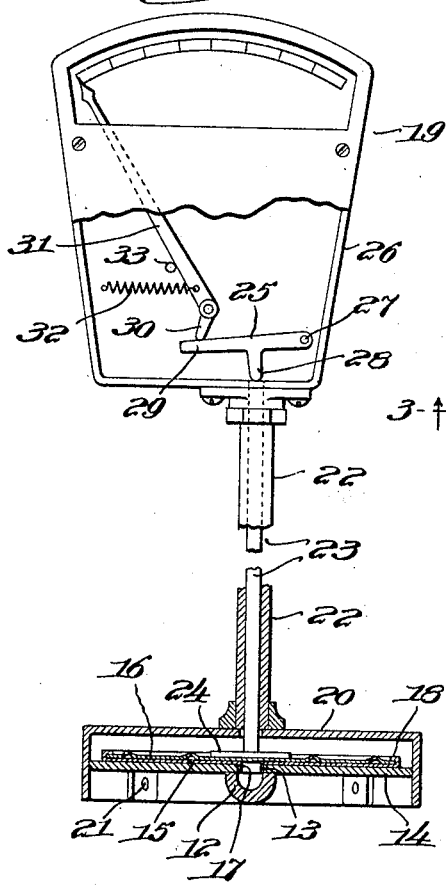
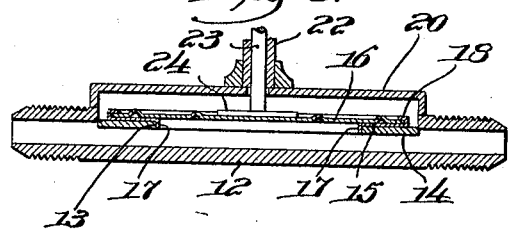
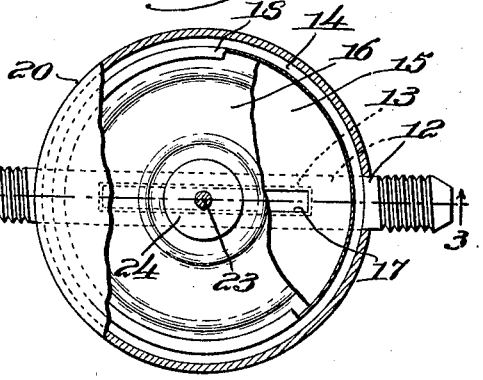
Inventors,
Armand Galdi
Eric S. Petersore,
by Edward F. Allen.
their Atty.

Patented May 15, 1928.

1,669,460

UNITED STATES PATENT OFFICE.

ARMAND GALDI, OF SOMERVILLE, AND ERIC S. PETERSON, OF LEXINGTON, MASSACHUSETTS.

LIQUID GAUGE.

Application filed May 21, 1925. Serial No. 31,952.

This invention relates to liquid gauges and more particularly to such a one as might be used to indicate the quantity of gasoline in the tank of an automobile.

It is an object of the invention to produce a liquid gauge at very low cost, and simple, yet durable structure, that may be easily and rapidly applied to existing gasoline installations without the services of a skilled mechanic.

It is a further object of the invention to produce a gauge wherein the liquid upon leaving the tank passes by and effects changes in the condition of a diaphragm according to the amount or quantity of gasoline in the tank, which changes are indicated by simple means, located, when used on an automobile, on the instrument board or dash thereof.

Another object of the invention is to produce a gauge which has no direct physical contact with the liquid tank but which may be installed in the pipe line leading therefrom.

A still further object of the invention is to produce a gauge wherein the use of a column of trapped air is dispensed with, thereby eliminating inaccurate readings due to extreme changes in temperature.

Other objects of the invention will be fully understood from a description of the drawings and the claims hereinafter given.

Of the drawings:

Figure 1 represents in side elevation partially broken away the gasoline tank and carburetor of a well known make of automobile, the invention being shown by a device installed in the pipe line connecting the said tank and carburetor.

Figure 2 is an enlarged face view of the indicator and its actuating diaphragm partially broken away.

Figure 3 is a section on the line 3—3 Figure 4.

Figure 4 is a top plan view of the device seen in Figure 3, certain of the parts being broken away for clearness.

Like characters represent like parts throughout the several figures of the drawings.

Referring to the drawings:

The drawings herewith represent the invention as applied to the gasoline line of a well known make of automobile, but it will be understood that it has other uses and therefore it is not the intention to limit the invention to the precise construction and arrangement shown as it is possible to make changes therein without departing from its spirit and scope.

For convenience in explaining the invention it is herein shown as applied to the gasoline line of a Ford gasoline installation and is located between the tank 10 and the carburetor 11.

The device comprises a fitting composed of a short length of pipe 12 having an elongated slot 13 in its top side, the said pipe 12 being cut away at its top side to receive a disk 14 which also has an elongated slot therein and in register with the slot of said pipe.

The disk 14 is soldered or otherwise firmly secured to the said pipe in such manner as to prevent leakage of gasoline.

The diaphragm is preferably composed of two parts 15 and 16, the part 15 having an elongated opening defined by the downwardly turned edges 17 which snugly fit into the slot of the disk 14 to which they are secured by solder or by means capable of making a tight joint.

The part 16 which has strengthening conrugations therein is secured to the part 15 by the overturned edge 18 thereof which is also soldered or otherwise secured in a manner to form a tight joint at that point.

As a matter of protection for the diaphragm, and to form a base for the support of the indicator 19, a cover 20 is provided which snugly surrounds the disk 14 to which it is secured by screws 21.

Firmly secured to the cover 20 and upstanding therefrom is a tube 22 in which a rod 23 is loosely mounted, said rod having a disk 24 at its lower end arranged to rest on the part 16 of the diaphragm.

At its upper end the said rod supports a T shaped lever 25 which is pivoted to the case 26 at 27, one of its limbs 28 resting on the rod 23, while the other limb 29 contacts with the short arm 30 of a bell crank shaped arrow 31 which is under the influence of a spring 32 tending to retain the said arrow against the stop pin 33 when the tank 10 is empty.

From the foregoing it will be readily seen that when there is gasoline in the tank 10 and the valve 34 is open, the pipe 35 leading to the carburetor 11 will be filled to the exclusion of air and the pressure or weight of gasoline will cause the part 16 of the diaphragm to bulge upwardly proportionately to the weight or pressure exerted thereon which depends upon the amount or quantity of gasoline in the tank 10.

Movement of the part 16 imparts upward movement to the rod 23, and through the lever 25 the arrow 31 is moved against the action of the spring 32 to indicate the amount or depth of gasoline in the tank 10.

Having described the invention we claim:

1. A liquid gauge comprising a fitting arranged to form a continuation of an outlet pipe for a liquid container, and comprising a pipe having an opening therein arranged to be sealed by a diaphragm, a diaphragm arranged to seal said opening and to contact with liquid passing through said pipe, a disk having an opening therein in register with said first opening and arranged to support a protective cover for said diaphragm; a cover for said diaphragm arranged to be secured to said disk and to form a base for the support of an indicator; an indicator; a tube secured to said cover and upstanding therefrom and arranged to support said indicator; and a rod in said tube arranged to contact with said diaphragm and actuate said indicator.

2. A liquid gauge comprising a pipe fitting made with a diaphragm chamber and with a conduit adjacent thereto having an inlet end adapted to be connected with a reservoir or the like and an outlet end adapted to be connected with the end of a pipe; a diaphragm within said chamber constituting a portion of the wall of said conduit; an upstanding tubular post connected at its lower end with said diaphragm chamber and communicating with the interior thereof; a rod mounted within said tubular post with provision for endwise movement therein whose lower end is in abutting engagement with the middle portion of said diaphragm, so that said rod is operated by the latter, and an indicator mechanism supported by the upper end of said post and operated through abutting engagement with the upper end of said rod.

3. A liquid gauge comprising a pipe fitting made with a diaphragm chamber and with a conduit adjacent thereto having an inlet end adapted to be connected with a reservoir or the like and an outlet end adapted to be connected with the end of a pipe; a diaphragm within said chamber constituting a portion of the wall of said conduit; an upstanding tubular post connected at its lower end with said diaphragm chamber and communicating with the interior thereof; a rod mounted within said tubular post with provision for endwise movement therein whose lower end is in abutting engagement with the middle portion of said diaphragm, so that said rod is operated by the latter, and an indicator mechanism at the upper end of said post comprising a pivotally supported lever having abutting engagement with the upper end of said rod and a pivotally supported pointer operated by said lever.

Signed by us at Boston, Mass., this 20th day of May, 1925.

ARMAND GALDI.
ERIC S. PETERSON.